(12) United States Patent
Zhao et al.

(10) Patent No.: US 11,349,887 B2
(45) Date of Patent: *May 31, 2022

(54) ESTIMATING NETWORK DATA STREAMING RATE

(71) Applicant: AT&T Intellectual Property I, L.P., Atlanta, GA (US)

(72) Inventors: Yongdong Zhao, Pleasanton, CA (US); Yali Liu, Dublin, CA (US); Zhengye Liu, Pleasanton, CA (US); Zuxian Guo, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,904

(22) Filed: Aug. 23, 2019

(65) Prior Publication Data

US 2019/0379710 A1 Dec. 12, 2019

Related U.S. Application Data

(63) Continuation of application No. 15/587,479, filed on May 5, 2017, now Pat. No. 10,397,286.

(51) Int. Cl.
*H04L 65/1083* (2022.01)
*H04L 65/60* (2022.01)
(Continued)

(52) U.S. Cl.
CPC ........ *H04L 65/1083* (2013.01); *H04L 65/607* (2013.01); *H04L 67/02* (2013.01); *H04L 67/06* (2013.01)

(58) Field of Classification Search
CPC ... H04L 65/1083; H04L 67/06; H04L 65/607; H04L 67/02
See application file for complete search history.

(56) References Cited

U.S. PATENT DOCUMENTS 6,993,689 B2 1/2006 Nagai et al.
7,400,678 B2 * 7/2008 Dankworth ....... H04L 29/06027
375/240.01
(Continued)

FOREIGN PATENT DOCUMENTS

CN 102333089 A 1/2012
EP 1182841 B1 1/2016
(Continued)

OTHER PUBLICATIONS

US 8,848,564 B2, 09/2014, Ochiai (withdrawn)
(Continued)

*Primary Examiner* — Jimmy H Tran

(57) ABSTRACT

In one example, the present disclosure describes a device, computer-readable medium, and method for estimating the streaming rate at which data is delivered over a network. For instance, in one example, a data packet is intercepted from a data streaming session conducted between a first device and a second device connected over a network. A size of a file segment contained in the data packet is calculated. The file segment corresponds to a portion of an item of multimedia content being delivered via the data streaming session. The encoding rate of the data streaming session is then calculated based at least in part on the size of the file segment.

20 Claims, 3 Drawing Sheets

(51) Int. Cl.
*H04L 67/02* (2022.01)
*H04L 67/06* (2022.01)

(56) References Cited

U.S. PATENT DOCUMENTS

| | | | |
|---|---|---|---|
| 7,444,418 B2 | 10/2008 | Chou et al. | |
| 7,515,538 B2 | 4/2009 | Gefflaut et al. | |
| 7,536,469 B2* | 5/2009 | Chou | H04N 21/23406 709/231 |
| 7,609,645 B2 | 10/2009 | Miyaji et al. | |
| 7,903,652 B2* | 3/2011 | Huang | H04L 65/4076 370/390 |
| 8,099,755 B2 | 1/2012 | Bajpai et al. | |
| 8,396,983 B1* | 3/2013 | Inskip | H04L 65/80 709/233 |
| 8,462,778 B2 | 6/2013 | Henocq et al. | |
| 8,483,274 B2 | 7/2013 | Toyota et al. | |
| 8,495,237 B1 | 7/2013 | Billinski et al. | |
| 8,504,713 B2* | 8/2013 | Arya | H04L 65/80 709/231 |
| 8,874,777 B2 | 10/2014 | Ma et al. | |
| 8,923,151 B2 | 12/2014 | Ochiai | |
| 8,934,395 B2 | 1/2015 | Gorokhov et al. | |
| 8,949,206 B2* | 2/2015 | Dhanapal | H04L 65/4084 707/695 |
| 9,042,441 B2 | 5/2015 | Shaw et al. | |
| 9,094,662 B2 | 7/2015 | Sung et al. | |
| 9,189,806 B2 | 11/2015 | Manzari et al. | |
| 9,191,664 B2 | 11/2015 | Melnyk et al. | |
| 9,201,979 B2 | 12/2015 | Ramer et al. | |
| 9,392,337 B2 | 7/2016 | Dixit et al. | |
| 9,462,021 B2 | 10/2016 | Ramamurthy et al. | |
| 9,473,406 B2 | 10/2016 | Penner et al. | |
| 9,473,736 B2* | 10/2016 | Vince | H04N 21/2347 |
| 9,503,490 B2 | 11/2016 | Gao et al. | |
| 9,509,793 B2* | 11/2016 | Brown | H04L 67/28 |
| 9,538,220 B2 | 1/2017 | ElArabawy et al. | |
| 9,560,392 B2* | 1/2017 | Parekh | H04L 65/607 |
| 9,565,228 B2* | 2/2017 | Bradley | H04N 21/26216 |
| 9,571,550 B2 | 2/2017 | Mehrotra et al. | |
| 9,584,577 B2* | 2/2017 | Caulfield | H04L 65/80 |
| 9,628,976 B2 | 4/2017 | Jeong et al. | |
| 9,628,977 B2 | 4/2017 | Chai | |
| 9,722,903 B2* | 8/2017 | Halepovic | H04L 43/0894 |
| 9,756,102 B2* | 9/2017 | Mao | H04L 65/4084 |
| 9,838,452 B2* | 12/2017 | Bae | H04L 67/02 |
| 9,838,460 B2 | 12/2017 | Seema et al. | |
| 9,838,760 B2* | 12/2017 | Seema | H04N 21/64322 |
| 9,979,931 B2* | 5/2018 | Cheng | H04N 21/23418 |
| 10,004,001 B2 | 6/2018 | Zhou | |
| 10,033,824 B2* | 7/2018 | Li | H04N 21/64322 |
| 10,244,025 B2* | 3/2019 | Powers | H04L 12/1895 |
| 10,382,517 B2* | 8/2019 | Zhao | H04N 21/8456 |
| 2003/0198184 A1 | 10/2003 | Huang et al. | |
| 2005/0021830 A1* | 1/2005 | Urzaiz | H04L 47/10 709/234 |
| 2005/0094725 A1* | 5/2005 | Hui | H04N 19/114 375/240.02 |
| 2005/0213502 A1* | 9/2005 | Convertino | H04L 1/0014 370/229 |
| 2006/0018257 A1* | 1/2006 | Seo | H04L 47/10 370/232 |
| 2009/0125636 A1* | 5/2009 | Li | H04L 65/602 709/231 |
| 2009/0164657 A1* | 6/2009 | Li | H04L 65/80 709/233 |
| 2010/0121974 A1* | 5/2010 | Einarsson | H04L 47/25 709/231 |
| 2011/0299588 A1 | 12/2011 | Zhou et al. | |
| 2012/0324123 A1* | 12/2012 | Fox | G06F 15/781 709/231 |
| 2013/0042015 A1* | 2/2013 | Begen | H04N 21/6125 709/231 |
| 2013/0086275 A1* | 4/2013 | Melnyk | H04L 65/608 709/231 |
| 2014/0013376 A1* | 1/2014 | Xu | H04N 21/26258 725/116 |
| 2014/0019593 A1* | 1/2014 | Reznik | H04L 65/60 709/219 |
| 2014/0019633 A1* | 1/2014 | Zhang | H04L 65/80 709/231 |
| 2014/0019635 A1 | 1/2014 | Reznik et al. | |
| 2014/0108495 A1* | 4/2014 | Benno | H04N 21/8456 709/203 |
| 2014/0161050 A1* | 6/2014 | Grinshpun | H04N 21/2393 370/329 |
| 2014/0244805 A1* | 8/2014 | Lee | H04W 4/50 709/219 |
| 2014/0325023 A1* | 10/2014 | Caulfield | H04L 65/80 709/219 |
| 2014/0344410 A1* | 11/2014 | Saremi | H04L 65/602 709/219 |
| 2014/0351638 A1* | 11/2014 | Chang | H04L 1/08 714/18 |
| 2015/0023404 A1* | 1/2015 | Li | H04N 19/152 375/240.02 |
| 2015/0026309 A1* | 1/2015 | Radcliffe | H04L 65/605 709/219 |
| 2015/0163273 A1* | 6/2015 | Radcliffe | H04L 47/125 709/231 |
| 2015/0181215 A1* | 6/2015 | Ozawa | H04N 19/156 375/240.02 |
| 2015/0350390 A1 | 12/2015 | Williams et al. | |
| 2016/0065995 A1* | 3/2016 | Phillips | H04L 1/0014 725/62 |
| 2016/0072637 A1* | 3/2016 | Gholmieh | H04L 12/1881 709/219 |
| 2016/0112728 A1* | 4/2016 | Kaushik | H04L 41/0893 725/116 |
| 2016/0119398 A1* | 4/2016 | Lefebvre | H04N 21/23805 709/231 |
| 2016/0127954 A1 | 5/2016 | Zhou | |
| 2016/0198226 A1 | 7/2016 | Krebs | |
| 2016/0241896 A1* | 8/2016 | Phillips | H04N 21/2183 |
| 2016/0260141 A1* | 9/2016 | Zhang | H04N 21/8456 |
| 2016/0294505 A1 | 10/2016 | Turner et al. | |
| 2016/0302128 A1 | 10/2016 | Anchan et al. | |
| 2016/0366202 A1* | 12/2016 | Phillips | H04L 65/602 |
| 2016/0373551 A1* | 12/2016 | Karuppiah | H04L 67/02 |
| 2017/0055007 A1* | 2/2017 | Phillips | H04N 21/2353 |
| 2017/0078180 A1* | 3/2017 | Hagh | H04L 43/10 |
| 2017/0331666 A1* | 11/2017 | Walker | H04N 21/234 |
| 2018/0020035 A1 | 1/2018 | Boggia et al. | |
| 2018/0063202 A1 | 3/2018 | Dhanabalan et al. | |
| 2018/0109819 A1* | 4/2018 | Lu | H04N 21/25808 |
| 2018/0288114 A1* | 10/2018 | Liu | H04L 65/602 |
| 2018/0288773 A1* | 10/2018 | Liu | H04L 47/2416 |
| 2018/0359297 A1* | 12/2018 | Mih | H04L 65/608 |
| 2019/0222622 A1* | 7/2019 | Jones | H04L 65/1059 |
| 2019/0342591 A1* | 11/2019 | Nilsson | H04N 21/23439 |
| 2019/0364311 A1* | 11/2019 | Nilsson | H04L 47/12 |

FOREIGN PATENT DOCUMENTS

| | | |
|---|---|---|
| EP | 3036959 A1 | 8/2016 |
| GB | 2540571 A | 1/2017 |
| GB | 2542174 A | 3/2017 |
| WO | 2013162506 A1 | 10/2013 |
| WO | 2017000131 A1 | 1/2017 |

OTHER PUBLICATIONS

Zhao, Mincheng, et al. "QoE-driven cross-layer optimization for wireless dynamic adaptive streaming of scalable videos over HTTP." IEEE Transactions on Circuits and Systems for Video Technology 25.3 (2014): 451-465.*

Howdy Pierce, "Measuring the Bitrate of a Video Stream", Cardinal Peak, cardinalpeak.com, Mar. 6, 2012. 4 Pages. https://cardinalpeak.com/blog/measuring-the-bitrate-of-a-video-streatm/.

Xiaojun Hei et al., "Inferring network-wide quality in P2P live streaming systems", IEEE journal on Selected Areas in Communi-

(56) References Cited

OTHER PUBLICATIONS cations vol. 25 Issue 9 (Dec. 4, 2007). pp. 1640-1654. http://www.paper.edu.cn/selfs.downpaper/heixiaojun103746-self-201110-2.

Dongeun Suh et al., "QoE-enhanced adaptation algorithm over DASH for multimedia streaming", IEEE 2014 International Conference on Information Networking (ICOIN), (Feb. 10, 2014). 6 Pages. https://www.researchgate.net/profile/Dongeun_Suh/publication/263803974_QoE-.

Chao Zhou et al., "A control-theoretic approach to rate adaption for DASH over multiple content distribution servers", IEEE Transactions on Circuits and Systems for Video Technology vol. 24 Issue 4 (2014). pp. 681-694. https://pdfs.semanticscholar.org/0665/9fefe0cee411fc9d3fa996cd5eabda9e1c9f.pdf.

Parikshit Julur et al., "Cache'n dash: Efficient caching for dash", ACM SIGCOMM Computer Communication Review vol. 45 No. 4, ACM (Aug. 15, 2015). pp. 599-600.

Arkadiusz Biernacki, "A Novel Play-out Algorithm for HTTP Adaptive Streaming", arXiv preprint arXiv:1511.00112 (Oct. 31, 2015). pp. 1-17.

\* cited by examiner

ESTIMATING NETWORK DATA STREAMING RATE

This application is a continuation of U.S. patent application Ser. No. 15/587,479, filed May 5, 2017, now U.S. Pat. No. 10,397,286, which is herein incorporated by reference in its entirety.

The present disclosure relates generally to data streaming, and relates more particularly to devices, non-transitory computer-readable media, and methods for estimating the data streaming rate over a network.

BACKGROUND

Many computing devices, including mobile computing devices such as smart phones, tablet computers, and the like, are capable of accessing data over a network. Video streaming over the Internet, for instance, is one of the most widely used data services. When streaming a video, a computing device constantly receives and displays video data delivered by a provider. The provider may store the video data at some remote location (e.g., a server) in a series of file segments, where each file segment contains a different portion of the video data. The provider may deliver these file segments individually to the computing device over the network. The computing device may download and store these file segments temporarily (e.g., at least long enough to play back the data) in a buffer.

The volume of network traffic generated by streaming video services often consumes more network bandwidth than any other application.

SUMMARY

In one example, the present disclosure describes a device, computer-readable medium, and method for estimating the streaming rate at which data is delivered over a network. For instance, in one example, a data packet is intercepted from a data streaming session conducted between a first device and a second device connected over a network. A size of a file segment contained in the data packet is calculated. The file segment corresponds to a portion of an item of multimedia content being delivered via the data streaming session. The encoding rate of the data streaming session is then calculated based at least in part on the size of the file segment.

In another example, a device includes a processor and a computer-readable medium storing instructions which, when executed by the processor, cause the processor to perform operations. The operations include intercepting a data packet from a data streaming session conducted between a first device and a second device connected over a network, calculating a size of a file segment contained in the data packet, wherein the file segment corresponds to a portion of an item of multimedia content being delivered via the data streaming session, and calculating an encoding rate of the data streaming session, based at least in part on the size of the file segment.

In another example, a non-transitory computer-readable storage medium stores instructions which, when executed by a processor, cause the processor to perform operations. The operations include intercepting a data packet from a data streaming session conducted between a first device and a second device connected over a network, calculating a size of a file segment contained in the data packet, wherein the file segment corresponds to a portion of an item of multimedia content being delivered via the data streaming session, and calculating an encoding rate of the data streaming session, based at least in part on the size of the file segment.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
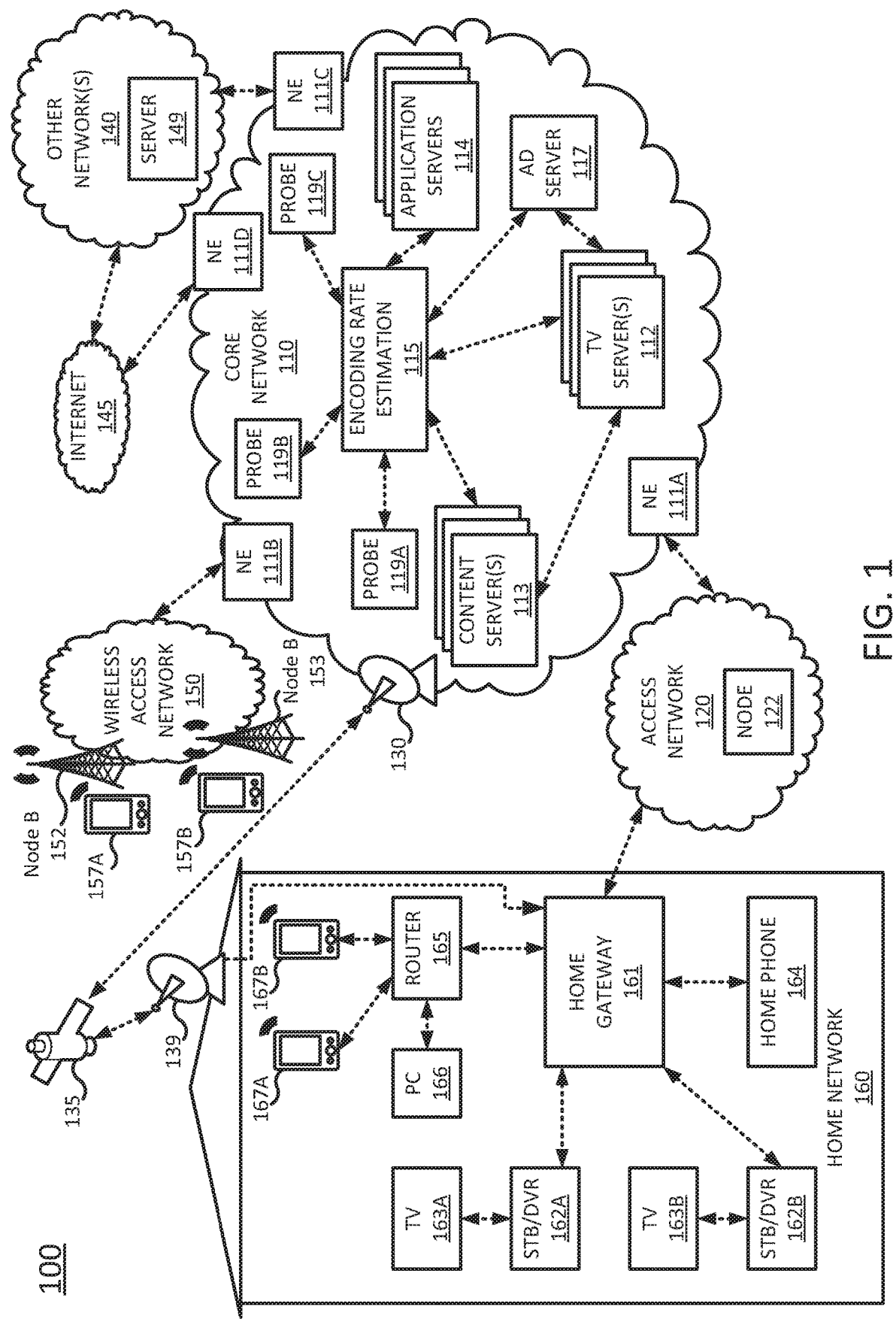
FIG. 1 illustrates an example network related to the present disclosure.

In one example, the present disclosure estimates the streaming rate at which data is delivered over a network. As discussed above, the volume of network traffic generated by streaming video services often consumes more network bandwidth than any other application. As such, network access providers have prioritized the ability to provide good performance for these applications. One of the primary metrics for measuring the performance of a video streaming application is the video encoding rate that can be supported by the network. The video encoding rate determines the video quality that the end user sees on his or her user endpoint device (e.g., smart phone, tablet computer, laptop computer, set top box, smart television, etc.). However, the video encoding rate can be difficult to measure accurately, in part because different video streaming applications may adopt very different video transmission schemes/protocols with very different configurations.

One particular data streaming protocol that is widely used in current practice is the dynamic adaptive streaming over hypertext transfer protocol (DASH) protocol. The DASH protocol is an adaptive bitrate streaming technique that enables high quality streaming of media content over the Internet, delivered from conventional hypertext transfer protocol (HTTP) servers. DASH works by breaking the multimedia content into a sequence of small HTTP-based file segments (also referred to herein as simply "segments," and sometimes referred to in the field as "chunks"). Each segment contains a fixed interval of playback time (also referred to as a "segment time") of the media content. The media content may be made available at a variety of different defined bitrates (or encoding rates), such that there are, for each interval of playback time, a plurality of corresponding segments encoded at different bitrates. For instance, a service provider may provide media content at seven different display resolutions (e.g., line×column), where each different display resolution corresponds to a different bitrate. The display resolution of the file segment further correlates to the size of the file segment.

When the media content is played back at a user endpoint device, the user endpoint device may automatically select, from the plurality of segments, the next segment to download and play back. The selection of which segment to download and play back may be based, at least in part, on current network conditions. For instance, the user endpoint device may select the segment with the highest possible bitrate that can be downloaded in time for playback without causing playback to stall or without re-buffering events in the playback. Thus, the user endpoint device can seamlessly adapt to changing network conditions and provide high quality playback.

Examples of the present disclosure estimate the video encoding rate of a stream of video data by measuring the size of the file segments delivered to the user endpoint device. Different video encoding rates utilize different sized file segments. Thus, by dividing the size of a file segment by the duration of the segment (i.e., the segment time), one can estimate the video encoding rate of the data stream including the segment. Since the segment size is one of a limited number of sizes, and the segment size can be easily measured with accuracy, the video encoding rate can be estimated in this manner more precisely than if one attempted to measure the encoding rate directly. Once the video encoding rate is known, a service provider can use this information to optimize network design, plan network capacity, and perform other tasks related to improving user experience.

Although examples of the present disclosure are described within the context of video streaming applications, the concepts disclosed herein may be used to estimate the encoding rate for any data streaming application that delivers data in segments (e.g., music streaming applications, video games, etc.).

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an encoding rate estimation server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and encoding rate estimation server 115 to select which video programs, or other content and advertisements to provide to the home network 160 and to others.

In one example, content servers 113 may store scheduled television broadcast content for a number of television channels, video-on-demand programming, local programming content, and so forth. For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, encoding rate estimation server 115 may estimate the video encoding rate for media delivered by content servers 113 and/or advertising server 117 to user endpoint devices including mobile devices 157A, 157B, 167A, and 167B and home network devices. To this end, the encoding rate estimation server 115 may communicate with one or more probes 119A, 119B, or 119C that intercept and replicate data packets that are delivered by content servers 113 and/or advertising server 117 to user endpoint devices including mobile devices 157A, 157B, 167A, and 167B and home network devices. Although only three 119A, 119B, and 119C are illustrated in FIG. 1, the encoding rate estimation server 115 may be in communication with any number of probes. Both the encoding rate estimation server 115 and the probes 119A, 119B, and 119C may be hosted by a network service provider who provides customers with access to the core network 110.

Figure 3:
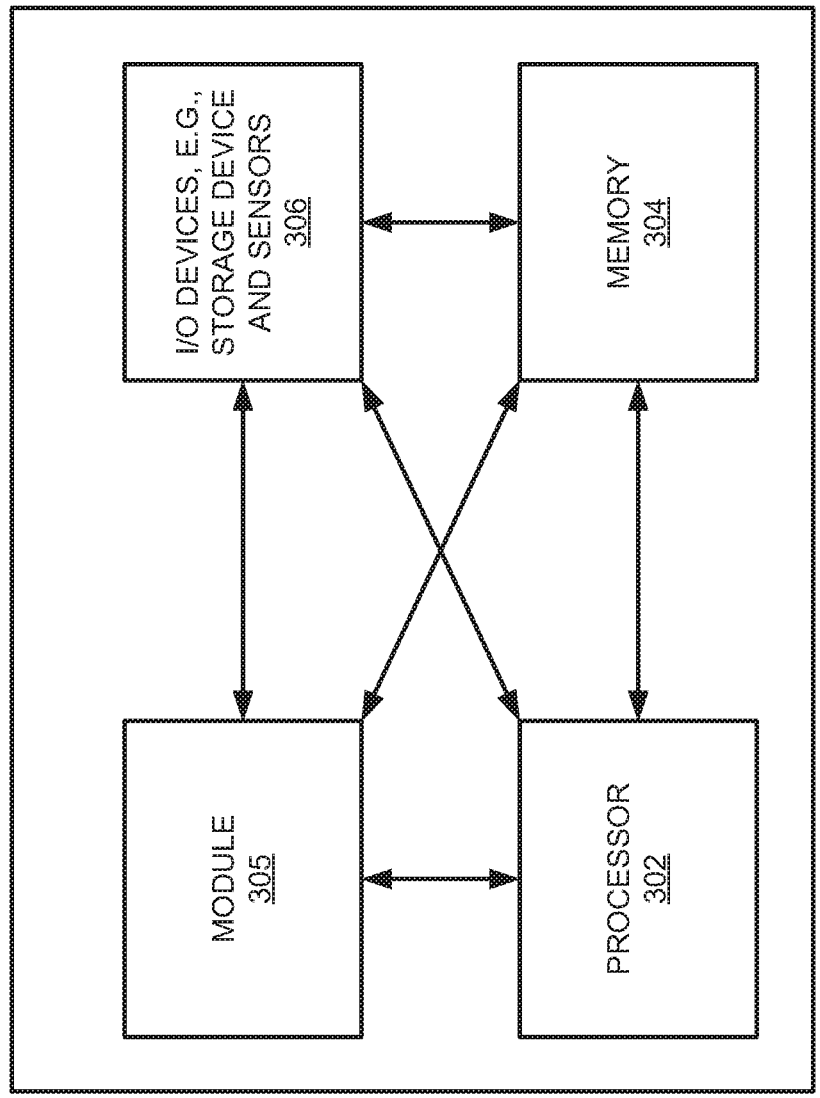
FIG. 3 depicts a high-level block diagram of a computing device specifically programmed to perform the functions described herein.

In one example, any or all of the television servers 112, content servers 113, application servers 114, encoding rate estimation server 115, and advertising server 117 may comprise a computing system, such as computing system 300 depicted in FIG. 3

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content and/or metadata files from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data files are forwarded to set-top boxes (STBs)/digital video recorders (DVRs) 162A and 162B to be decoded, recorded, and/or forwarded to television (TV) 163A and TV 163B for presentation or to connected home devices (CHDs) 170A and 170B for further action. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
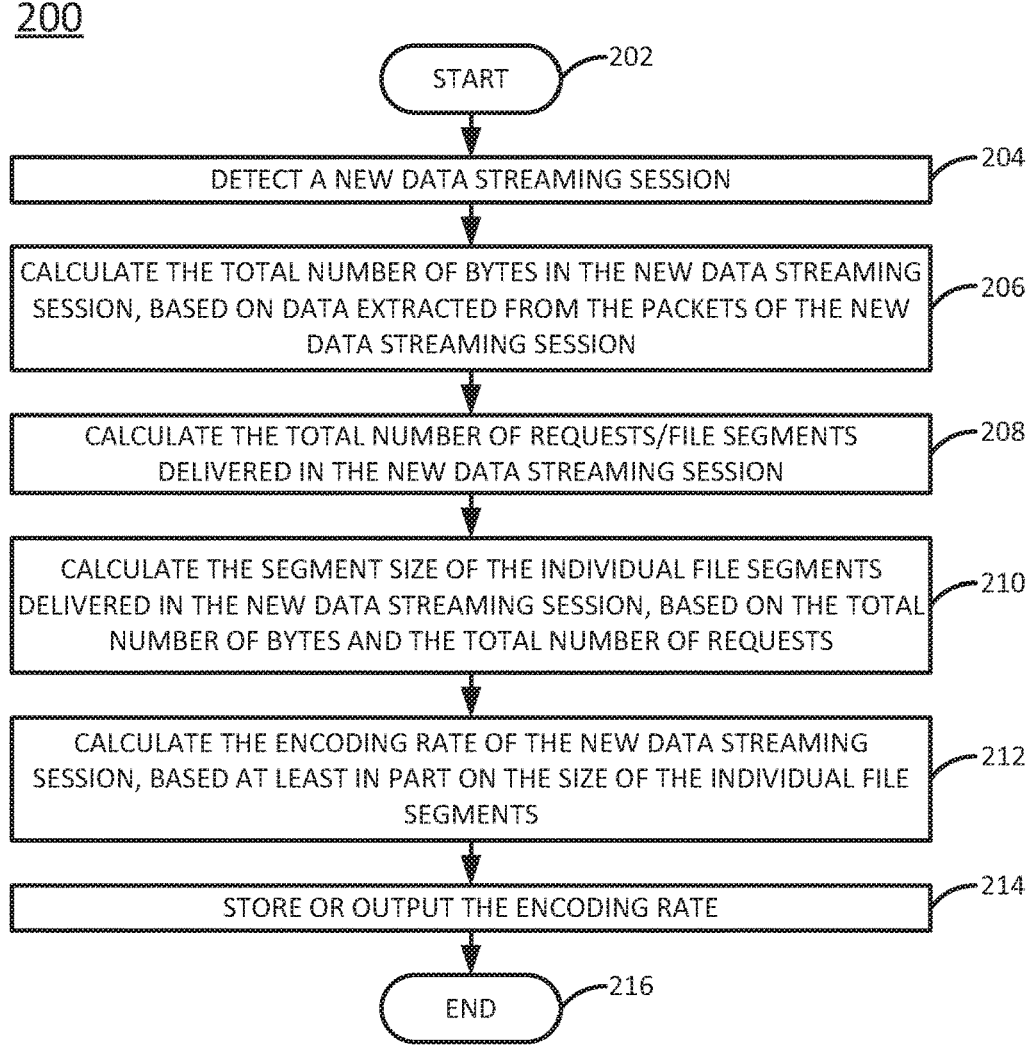
FIG. 2 illustrates a flowchart of an example method for estimating the streaming rate at which data is delivered over a network in accordance with the present disclosure.

To further aid in understanding the present disclosure, FIG. 2 illustrates a flowchart of an example method 200 for estimating the streaming rate at which data is delivered over a network in accordance with the present disclosure. In one example, the method 200 may be performed by an application server, such as the encoding rate estimation server 115 illustrated in FIG. 1. However, in other examples, the method 200 may be performed by another device. As such, any references in the discussion of the method 200 to the encoding rate estimation server 115 (or to any other components of FIG. 1) are not intended to limit the means by which the method 200 may be performed. Moreover, although examples of the method 200 are discussed within the context of a DASH protocol data streaming session, it will be appreciated that the methods disclosed are not limited to implementation with this one type of data transmission protocol.

The method 200 begins in step 202. In step 204, the encoding rate estimation server 115 detects a new HTTP data streaming session in accordance with one or more data packets that are received from a probe, such as one of the probes 119A, 119B, or 119C. For instance, the encoding rate estimation server 115 may detect a series of packets comprising a transport control protocol (TCP) handshake that signals the start of a new HTTP session between two devices (e.g., between a content server and a user endpoint device).

In step 206, the encoding rate estimation server 115 calculates the total number of bytes in the new HTTP data streaming session, based on information extracted from the packets that it continues to receive from the probe(s) 119A, 119B, or 119C. For instance, the total number of bytes may be calculated from information contained in the packet headers. When streaming data using the DASH protocol, one HTTP session is typically used to transport multiple file segments. Thus, in this case, each data packet may contain (e.g., in its payload) a portion of one file segment corresponding to portions of an item of multimedia content (e.g., a video) being streamed.

In step 208, the encoding rate estimation server 115 calculates the total number of HTTP requests in the new HTTP data streaming session, based on information extracted from the packets that it continues to receive from the probe(s) 119A, 119B, or 119C. In one example, there is a one-to-one correspondence between HTTP requests and file segments delivered. That is, each HTTP request contains a request for one file segment. Thus, assuming each HTTP request is fulfilled, the total number of HTTP requests may be considered equal to the total number of file segments delivered in the new HTTP data streaming session.

In step 210, the encoding rate estimation server 115 calculates the segment size of the individual file segments that are delivered in the new HTTP data streaming session, based on the total number of bytes and the total number of HTTP requests. In one example, the segment size of an individual file segment may be calculated as the total number of bytes divided by the total number of HTTP requests. As discussed above, the segment size correlates with the resolution (e.g., display resolution) of the data contained in the file segments In step 212, the encoding rate estimation server 115 calculates the encoding rate of the new HTTP data streaming session, based at least in part of the segment size of the individual segments. In one example, the encoding rate may be calculated as the segment size divided by the segment time (i.e., the duration of the segment).

In step 214, the encoding rate estimation server 115 stores or outputs the encoding rate, e.g., so that the encoding rate may be reviewed by a service provider.

The method 200 ends in step 216.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server such as the encoding rate estimation server 115 could be implemented as illustrated in FIG. 3.

As depicted in FIG. 3, the system 300 comprises a hardware processor element 302, a memory 304, a module 305 for estimating the streaming rate at which data is delivered over a network, and various input/output (I/O) devices 306.

The hardware processor 302 may comprise, for example, a microprocessor, a central processing unit (CPU), or the like. The memory 304 may comprise, for example, random-access memory (RAM), read-only memory (ROM), a disk drive, an optical drive, a magnetic drive, and/or a Universal Serial Bus (USB) drive. The module 305 for estimating the streaming rate at which data is delivered over a network may include circuitry and/or logic for performing special purpose functions relating to the monitoring and measuring data streaming performance. The input/output devices 306 may include, for example, a camera, a video camera, storage devices (including, but not limited to, a tape drive, a floppy drive, a hard disk drive, a compact disc drive, a flash drive, or a solid-state drive), a receiver, a transmitter, a speaker, a display, a speech synthesizer, an output port, and a user input device (such as a keyboard, a keypad, a mouse, and the like), or a sensor.

Although only one processor element is shown, it should be noted that the general-purpose computer may employ a plurality of processor elements. Furthermore, although only one general-purpose computer is shown in the Figure, if the method(s) as discussed above is (are) implemented in a distributed or parallel manner fora particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for estimating the streaming rate at which data is delivered over a network (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for estimating the streaming rate at which data is delivered over a network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
acquiring, by a processing system including at least one processor, a replica of a data packet containing a file segment of a bitrate encoded item of multimedia content, wherein the data packet is part of a data streaming session conducted between a first device and a second device connected over a network, wherein the first device is a source of the data packet, the second device is a destination of the data packet, wherein the processing system is part of a third device that is separate from the first device and the second device, wherein the processing system acquires the replica of the data packet from a probe that intercepts and replicates the data packet, and wherein the probe is separate from the first device and the second device;
calculating, by the processing system, a size of the file segment contained in the replica of the data packet; and
calculating, by the processing system, an encoding rate of the data streaming session, based at least in part on the size of the file segment contained in the replica of the data packet.

2. The method of claim 1, wherein the data streaming session is a hypertext transfer protocol session.

3. The method of claim 2, wherein a number of file segments of the bitrate encoded item of multimedia content delivered via the data streaming session is equal to a number of hypertext transfer protocol requests made during the data streaming session.

4. The method of claim 2, wherein the hypertext transfer protocol session is a dynamic adaptive streaming over hypertext transfer protocol session.

5. The method of claim 1, wherein the encoding rate is calculated as the size of the file segment divided by a duration of the file segment.

6. The method of claim 1, wherein the encoding rate is one of a plurality of different defined encoding rates at which the file segment is available.

7. The method of claim 1, wherein the bitrate encoded item of multimedia content is a video.

8. The method of claim 1, wherein the network is the internet.

9. The method of claim 1, wherein the size of the file segment is one of a limited number of sizes.

10. The method of claim 1, wherein the size is calculated as a number of bytes.

11. A device comprising:
a processor; and
a computer-readable medium storing instructions which, when executed by the processor, cause the processor to perform operations, the operations comprising:
acquiring a replica of a data packet containing a file segment of a bitrate encoded item of multimedia content, wherein the data packet is part of a data streaming session conducted between a first device and a second device connected over a network, wherein the first device is a source of the data packet, the second device is a destination of the data packet, wherein the processor is part of the device that is separate from the first device and the second device, wherein the processor acquires the replica of the data packet from a probe that intercepts and replicates the data packet, and wherein the probe is separate from the first device and the second device;
calculating a size of the file segment contained in the replica of the data packet; and
calculating an encoding rate of the data streaming session, based at least in part on the size of the file segment contained in the replica of the data packet.

12. The device of claim 11, wherein the data streaming session is a hypertext transfer protocol session.

13. A non-transitory computer-readable storage medium storing instructions which, when executed by a processor, cause the processor to perform operations, the operations comprising:
acquiring a replica of a data packet containing a file segment of a bitrate encoded item of multimedia content, wherein the data packet is part of a data streaming session conducted between a first device and a second device connected over a network, wherein the first device is a source of the data packet, the second device is a destination of the data packet, wherein the processor is part of a third device that is separate from the first device and the second device, wherein the processor acquires the replica of the data packet from a probe that intercepts and replicates the data packet, and wherein the probe is separate from the first device and the second device;
calculating a size of the file segment contained in the replica of the data packet; and
calculating an encoding rate of the data streaming session, based at least in part on the size of the file segment contained in the replica of the data packet.

14. The non-transitory computer-readable storage medium of claim 13, wherein the data streaming session is a hypertext transfer protocol session.

15. The non-transitory computer-readable storage medium of claim 14, wherein a number of file segments of the bitrate encoded item of multimedia content delivered via the data streaming session is equal to a number of hypertext transfer protocol requests made during the data streaming session.

16. The non-transitory computer-readable storage medium of claim 14, wherein the hypertext transfer protocol session is a dynamic adaptive streaming over hypertext transfer protocol session.

17. The non-transitory computer-readable storage medium of claim 13, wherein the encoding rate is calculated as the size of the file segment divided by a duration of the file segment.

18. The non-transitory computer-readable storage medium of claim 13, wherein the encoding rate is one of a plurality of different defined encoding rates at which the file segment is available.

19. The non-transitory computer-readable storage medium of claim 13, wherein the bitrate encoded item of multimedia content is a video.

20. The non-transitory computer-readable storage medium of claim 13, wherein the network is the internet.

* * * * *